US011520882B2

(12) United States Patent
Giaconi

(10) Patent No.: US 11,520,882 B2
(45) Date of Patent: Dec. 6, 2022

(54) MULTI FACTOR NETWORK ANOMALY DETECTION

(71) Applicant: British Telecommunications Public Limited Company, London (GB)

(72) Inventor: Giulio Giaconi, London (GB)

(73) Assignee: British Telecommunications Public Limited Company, London (GB)

( * ) Notice: Subject to any disclaimer, the term of this patent is extended or adjusted under 35 U.S.C. 154(b) by 384 days.

(21) Appl. No.: 16/701,857

(22) Filed: Dec. 3, 2019

(65) Prior Publication Data

US 2020/0175161 A1 Jun. 4, 2020

(30) Foreign Application Priority Data

Dec. 3, 2018 (EP) ..................................... 18209886

(51) Int. Cl.
*G06F 21/55* (2013.01)
*G06N 3/08* (2006.01)
(52) U.S. Cl.
CPC ............. *G06F 21/554* (2013.01); *G06N 3/08* (2013.01)
(58) Field of Classification Search
CPC .......... G06F 21/554; G06F 21/55; G06N 3/08
USPC ...................................................... 726/22–25
See application file for complete search history.

(56) References Cited

U.S. PATENT DOCUMENTS

| | | | |
|---|---|---|---|
| 9,185,095 B1 * | 11/2015 | Moritz | H04L 63/0861 |
| 9,514,293 B1 * | 12/2016 | Moritz | H04L 67/143 |
| 9,798,876 B1 | 10/2017 | Parker-Wood et al. | |
| 10,749,883 B1 | 8/2020 | Martin et al. | |
| 10,949,534 B2 * | 3/2021 | Martin | G06F 21/577 |
| 11,108,787 B1 * | 8/2021 | Shen | G06N 3/0445 |
| 2005/0193281 A1 * | 9/2005 | Ide | H04L 69/40 714/4.1 |
| 2009/0234899 A1 * | 9/2009 | Kramer | G06F 16/2465 708/200 |
| 2010/0114973 A1 | 5/2010 | Goyal | |
| 2012/0072983 A1 * | 3/2012 | McCusker | H04L 63/126 726/22 |
| 2012/0131674 A1 * | 5/2012 | Wittenschlaeger | G06F 21/552 726/23 |

(Continued)

FOREIGN PATENT DOCUMENTS

| | | | |
|---|---|---|---|
| CN | 107633263 A | 1/2018 | |
| EP | 3355547 A1 | 8/2018 | |

(Continued)

OTHER PUBLICATIONS

Hesam Izakian, Anomaly Detection and Characterization in Spatial Time Series Data: A Cluster-Centric Approach, IEEE (Year: 2014).*

(Continued)

*Primary Examiner* — Kambiz Zand
*Assistant Examiner* — Mahabub S Ahmed
(74) *Attorney, Agent, or Firm* — Patterson Thuente IP

(57) ABSTRACT

A computer implemented method of detecting anomalous behavior in a set of computer systems communicating via a computer network, the method including evaluating a difference in a level of activity of the computer system between a baseline time period and a runtime time period, and responsive to a determination of anomalous behavior, implementing one or more protective measures for the computer network.

8 Claims, 5 Drawing Sheets

(56) References Cited

U.S. PATENT DOCUMENTS

| | | | |
|---|---|---|---|
| 2014/0096249 A1* | 4/2014 | Dupont | G06F 21/00 |
| | | | 726/23 |
| 2014/0245443 A1 | 8/2014 | Chakraborty | |
| 2014/0279762 A1* | 9/2014 | Xaypanya | H04L 63/145 |
| | | | 706/12 |
| 2015/0020199 A1 | 1/2015 | Neil et al. | |
| 2015/0269050 A1* | 9/2015 | Filimonov | G06N 20/10 |
| | | | 702/183 |
| 2016/0021141 A1* | 1/2016 | Liu | H04L 63/1425 |
| | | | 726/23 |
| 2016/0164901 A1* | 6/2016 | Mainieri | H04L 63/1425 |
| | | | 726/23 |
| 2016/0205122 A1 | 7/2016 | Bassett | |
| 2016/0359695 A1* | 12/2016 | Yadav | H04L 43/04 |
| 2017/0126712 A1 | 5/2017 | Crabtree et al. | |
| 2017/0279698 A1* | 9/2017 | Sartran | H04L 43/0823 |
| 2018/0004948 A1* | 1/2018 | Martin | H04L 63/1425 |
| 2018/0103052 A1 | 4/2018 | Choudhury et al. | |
| 2018/0152468 A1 | 5/2018 | Nor et al. | |
| 2018/0219895 A1 | 8/2018 | Silver et al. | |
| 2018/0260562 A1 | 9/2018 | Chen et al. | |
| 2018/0336437 A1 | 11/2018 | Cheng et al. | |
| 2018/0367548 A1 | 12/2018 | Stokes, III et al. | |
| 2019/0132344 A1* | 5/2019 | Lem | G06N 5/022 |
| 2019/0173899 A1 | 6/2019 | Tews et al. | |
| 2019/0312734 A1* | 10/2019 | Wentz | H04L 9/0877 |
| 2020/0067969 A1* | 2/2020 | Abbaszadeh | G06K 9/6269 |
| 2020/0304523 A1* | 9/2020 | Yadav | H04L 43/0894 |

FOREIGN PATENT DOCUMENTS

| | | |
|---|---|---|
| WO | WO-2017019391 A1 | 2/2017 |
| WO | WO-2017167544 A1 | 10/2017 |
| WO | WO-2017167545 A1 | 10/2017 |
| WO | WO-2018224669 A1 | 12/2018 |
| WO | WO-2018224670 A1 | 12/2018 |

OTHER PUBLICATIONS

Hesam Izakian, Clustering Spatiotemporal Data: An Augmented Fuzzy C-Means, IEEE (Year: 2013).*

Varun Chandola, Anomaly Detection for Discrete Sequences: A Survey, IEEE (Year: 2012).*

Jinbo Li, Multivariate time series anomaly detection: A framework of Hidden Markov Models, science direct (Year: 2016).*

Tae-YoungKim, Web traffic anomaly detection using C-LSTM neural network, science direct (Year: 2018).*

Radford et al., Network Traffic Anomaly Detection Using Recurrent Neural Networks, scholar.google.com (Year: 2018).*

Ring et al., "IP2Vec: Learning Similarities between IP Addresses," IEEE International Conference on Data Mining Workshops, 2017, 10 Pages.

Mikolov et al., "Efficient Estimation of Word Representations in Vector Space," ArXiv, CoRR (Computing Research Repository), 2013, 12 pages.

D. E. Rumelhart, G. E. Hinton, R. J. Williams, "Learning Internal Representations by Error Propagation," Institute for Cognitive Science Report 8506, University of California, San Diego, Sep. 1985, 49 pages.

M. Ester, H.-P. Kriegel and J. a. X. X. Sander, "A Density-based Algorithm for Discovering Clusters a Density-based Algorithm for Discovering Clusters in Large Spatial Databases with Noise," in Proc. Int. Conf. on Knowledge Discovery and Data Mining, Portland, OR, USA, 1996, 6 pages.

R. J. G. B. Campello, D. Moulavi and J. Sander, "Density-Based Clustering Based on Hierarchical Density Estimates," in Proc. Advances in Knowledge Discovery and Data Mining, Gold Coast, Australia, 2013, 13 pages.

Application and File history for U.S. Appl. No. 16/738,614, filed Dec. 3, 2019. Inventors Giulio Giaconi, as available on PAIR at www.uspto.gov.

Combination Search and Examination Report under Sections 17 & 18(3) for Great Britain Application No. 1819711.1, dated Jun. 10, 2019, 5 pages.

Combined Search and Examination Report under Sections 17 and 18(3) for Great Britain Application No. 1819703.8, dated May 13, 2019, 6 pages.

Combined Search and Examination Report under Sections 17 and 18(3) for Great Britain Application No. 1917557.9, dated May 20, 2020, 5 pages.

Eddy S R., "What is a Hidden Markov Model?," Nature Biotechnology, vol. 22 (10), Oct. 2004, pp. 1315-1316.

Extended European Search Report for European Application No. 18209886.3, dated Feb. 27, 2019, 6 pages.

Extended European Search Report for European Application No. 19212759.5, dated Apr. 14, 2020, 6 pages.

Extended European Search Report for Application No. 19150867.0, dated Jun. 6, 2019, 10 pages.

Extended European Search Report for Application No. 19217369.8, dated May 15, 2020, 10 pages.

Extended European Search Report for European Application No. 18209885.5, dated Mar. 6, 2019, 6 pages.

Goyal P., et al., "Capturing Edge Attributes via Network Embedding," IEEE Transactions on Computational Social Systems, vol. 5(4), Apr. 2018, 10 pages.

Goyal P., et al., "DynGEM: Deep Embedding Method for Dynamic Graphs," University of Southern California, Retrieved from the Internet: https://arxiv.org/pdf/1805.11273.pdf on May 29, 2018, 8 pages.

Grover A., et al., "node2vec: Scalable Feature Learning for Networks," arXiv: 1607.00653v1 [cs.SI], Jul. 3, 2016, 10 pages.

Gartner T., et al., "On Graph Kernels: Hardness Results and Efficient Alternatives," COLT/Kernel 2003, Learning Theory and Kernel Machines, Lecture Notes in Computer Science, vol. 2777, Springer, Berlin, Heidelberg, https://doi.org/10.1007/978-3-540-45167-9_11, pp. 129-143.

Heimann M., et al., "On Generalizing Neural Node Embedding Methods to Multi-Network Problems," MLG' 17, Aug. 2017, 4 pages.

Jinwon A., et al., "Variational Autoencoder based Anomaly Detection using Reconstruction Probability," Progress in Biomedical Optics and Imaging, SNU Data Mining Center, 2015-2 Special Lecture on IE, Dec. 27, 2015, XP055491966, ISSN: 1605-7422, ISBN: 978-1-5106-0027-0, 18 pages.

Muromagi A., et al., "Linear Ensembles of Word Embedding Models," Proceedings of the 21st Nordic Conference of Computational Linguistics, Gothenburg, Sweden, May 23-24, 2017, pp. 96-104.

Niepert M., et al., "Learning Convolutional Neural Networks for Graphs," Proceedings of the 33 rd International Conference on Machine Learning, New York, NY, USA, 2016. JMLR: W&CP vol. 48, arXiv: 1605.05273v4 [cs.LG], Jun. 8, 2016, 10 pages.

Page L., et al., "The PageRank Citation Ranking: Bringing Order to the Web," Jan. 29, 1998, pp. 1-17.

Pei J., et al., "Advances in Knowledge Discovery and Data Mining, Part II," 17th Pacific-Asia Conference, PAKDD 2013, Gold Coast, Australia, Apr. 2013, Proceedings, Part II, 608 pages.

Search Report under Section 17 for Great Britain Application No. 1900272.4, dated May 28, 2019, 5 pages.

Vishwanathan S.V.N., et al., "Graph Kernels," Journal of Machine Learning Research, 2010, vol. 11, pp. 1201-1242.

Weisstein E. W., "Isomorphic Graphs," WolframMathworld, From MathWorld—A Wolfram Web Resource, http://mathworld.wolfram.com/IsomorphicGraphs.html (Accessed Oct. 2018), 2 pages.

Yu W., et al., "Learning Deep Network Representations with Adversarially Regularized Autoencoders," Proceedings of the 24th ACM SIGKDD International Conference on Knowledge Discovery & Data Mining, KDD '18, vol. 23, XP055559657, Aug. 19, 2018, pp. 2663-2671.

Zhang J., et al., "Robust Network Traffic Classification," IEEE/ACM Transactions on Networking, vol. 23, No. 4, Aug. 2015, pp. 1257-1270.

* cited by examiner

MULTI FACTOR NETWORK ANOMALY DETECTION

RELATED APPLICATION

The present application claims priority to United Kingdom Application No. 18209886.3 filed Dec. 3, 2018, which is hereby incorporated herein in its entirety by reference.

TECHNICAL FIELD

The present disclosure relates to the detection of anomalous behavior of a computer system in a computer network.

BACKGROUND

Network connected computer systems, whether physical and/or virtual computer systems connected via one or more physical and/or virtual network communication mechanisms, can be susceptible to malicious attack. For example, one or more computer systems can become infected with malicious software such as botnet agents or the like, and such infected systems can instigate malicious communication with other systems such as communications intended to propagate such infections and/or communications intended to affect the operation of target computer systems (e.g. denial of service attacks, hijacking or the like).

SUMMARY

It is a longstanding desire to detect such malicious communication occurring in a network of computer systems in order that mitigation measures can be implemented.

The present disclosure accordingly provides, in a first aspect, a computer implemented method of detecting anomalous behavior in a set of computer systems communicating via a computer network, the method comprising: generating a baseline set of vector representations for each of a plurality of network communications occurring in the network during a baseline time period when the communications are absent malicious intervention, the vector representation being derived from a neural network trained using training data defined from the network communications; iteratively generating a runtime set of vector representations for each of a plurality of network communications occurring in the network during subsequent runtime time periods; applying a clustering algorithm to each of the baseline and runtime sets of vector representations to define each of a baseline and a runtime set of clusters of vector representations; determining a level of activity of each computer system during the baseline time periods, the level of activity being determined according to a sum of differences of vector representations for the computer system between sub-periods of the baseline time period; for each of the computer systems, determining anomalous behavior responsive to any of: a) an evaluation of a measure of difference between the baseline and runtime vector representations for the computer system exceeding a threshold level of difference; b) an evaluation of a change of cluster membership of a vector representation for the computer system between the baseline and runtime sets of clusters; c) an evaluation of a membership of a vector representation for the computer system in a runtime set of clusters; and d) an evaluation of a difference in a level of activity of the computer system between the baseline and the runtime time periods, and responsive to the determination of anomalous behavior, implementing one or more protective measures for the computer network.

In some embodiments, generating each of the baseline and runtime vector representations comprises: accessing data records each corresponding to an occurrence of communication occurring via the computer network and including a plurality of attributes of the communication; generating, for each of at least a subset of the data records, a training data item for a neural network, the training data item being derived from at least a portion of the attributes of the record and the neural network having input units and output units corresponding to items in a corpus of attribute values for communications occurring via the network; training the neural network using the training data items so as to define a vector representation for each attribute value in the corpus based on weights in the neural network for an input unit corresponding to the attribute value.

In some embodiments, the protective measures include one or more of: deploying and/or configuring a firewall at one or more computer systems connected via the computer network; deploying and/or configuring anti-malware facility at one or more computer systems connected via the computer network; deploying and/or configuring an antivirus facility at one or more computer systems connected via the computer network; adjusting a sensitivity and/or level of monitoring of a security facility in one or more computer systems connected via the computer network; and selectively disconnecting one or more computer systems from the computer network.

In some embodiments, the attributes of a communication include one or more of: an address of a source of the communication; an address of a destination of the communication; an identification of a communications port at a source of the communication; an identification of a communications port at a destination of the communication; an identifier of a protocol of the communication; a size of the communication; a number of packets of the communication; a set of network protocol flags used in the communication; a timestamp of the communication; and a duration of the communication.

In some embodiments, the neural network has a single layer of hidden units logically arranged between the input units and the output units.

In some embodiments, a difference between vector representations is evaluated by applying a vector similarity function.

The present disclosure accordingly provides, in a second aspect, a computer system including a processor and memory storing computer program code for performing the method set out above.

The present disclosure accordingly provides, in a third aspect, a computer program element comprising computer program code to, when loaded into a computer system and executed thereon, cause the computer to perform the method set out above.

BRIEF DESCRIPTION OF THE FIGURES

Embodiments of the present disclosure will now be described, by way of example only, with reference to the accompanying drawings, in which.

DETAILED DESCRIPTION OF EMBODIMENTS

Figure 1:
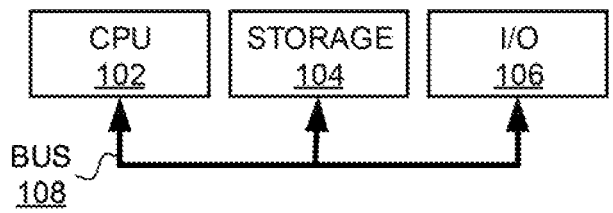
FIG. 1 is a block diagram a computer system suitable for the operation of embodiments of the present disclosure.

Embodiments of the present disclosure address the challenge of detecting anomalous behavior of computer systems communicating via a computer network by detecting anomalies in network communications occurring via the computer network. Such anomalies are detected based on representations of network communications known as embeddings in which each network communication is represented as a plurality of vector representations, each vector corresponding to an attribute of the communication including, for example, inter alia: a source address, a destination address, a source port, a destination port, a size, a number of packets, a timestamp, a duration, a network protocol, one or more network protocol parameters and other attributes as will be apparent to those skilled in the art. Thus, each communication occurring in the computer network can be represented as a plurality of vector representations (known as embeddings) that serve to characterize the communication, with multiple such communications being so encoded. Such embeddings serve to characterize typical network communication within the computer network. For example, embeddings generated during one or more time periods when the network is known to be absent malicious intervention serve to characterize the operation of the network devoid of such malicious intervention. Such embeddings can be considered baseline embeddings. Embeddings generated for subsequent time periods and, in some embodiments, continuously, can be compared against such baseline embeddings to detect changes occurring in the network communications via the network. Such changes can be considered anomalous, such as when a change exceeds a predetermined threshold degree of change, with the detection of such anomalies being used to trigger responsive measures such as network or computer system protective measures.

The generation of the vector representations as embeddings is achieved by training a fully connected neural network with a single hidden layer smaller than input and output layers. Each node in each of the input and output layers corresponds to a value of an attribute of a network communication such that all possible attribute values (across potentially multiple attribute types, such as addresses, protocols, ports, etc.) constitute a corpus of attribute values for communications occurring via the network. Thus, in some embodiments, the entire corpus of attribute values is represented by a node in each of the input layer and the output layer. The neural network is trained using training data derived from records of communication from which attribute values are extracted. Such an approach to the generation of embeddings is described in detail in "IP2Vec: Learning Similarities between IP Addresses" (Ring et al., 2017 IEEE International Conference on Data Mining Workshops) which itself builds upon the approach described in detail in "Efficient Estimation of Word Representations in Vector Space" (Mikolov et al., ArXiv, CoRR (Computing Research Repository), 2013). Both Ring et al. and Mikolov et al. are specifically cited here for their respective disclosures which, combined with the present specification, are to be read to provide sufficient disclosure of the present disclosure.

Embodiments of the present disclosure improve upon the approach of Ring et al. by the use of pre-processing of training data to enhance the characterization of network communication in the generated embeddings. Further, post-processing of embeddings is provided to improve anomaly detection.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
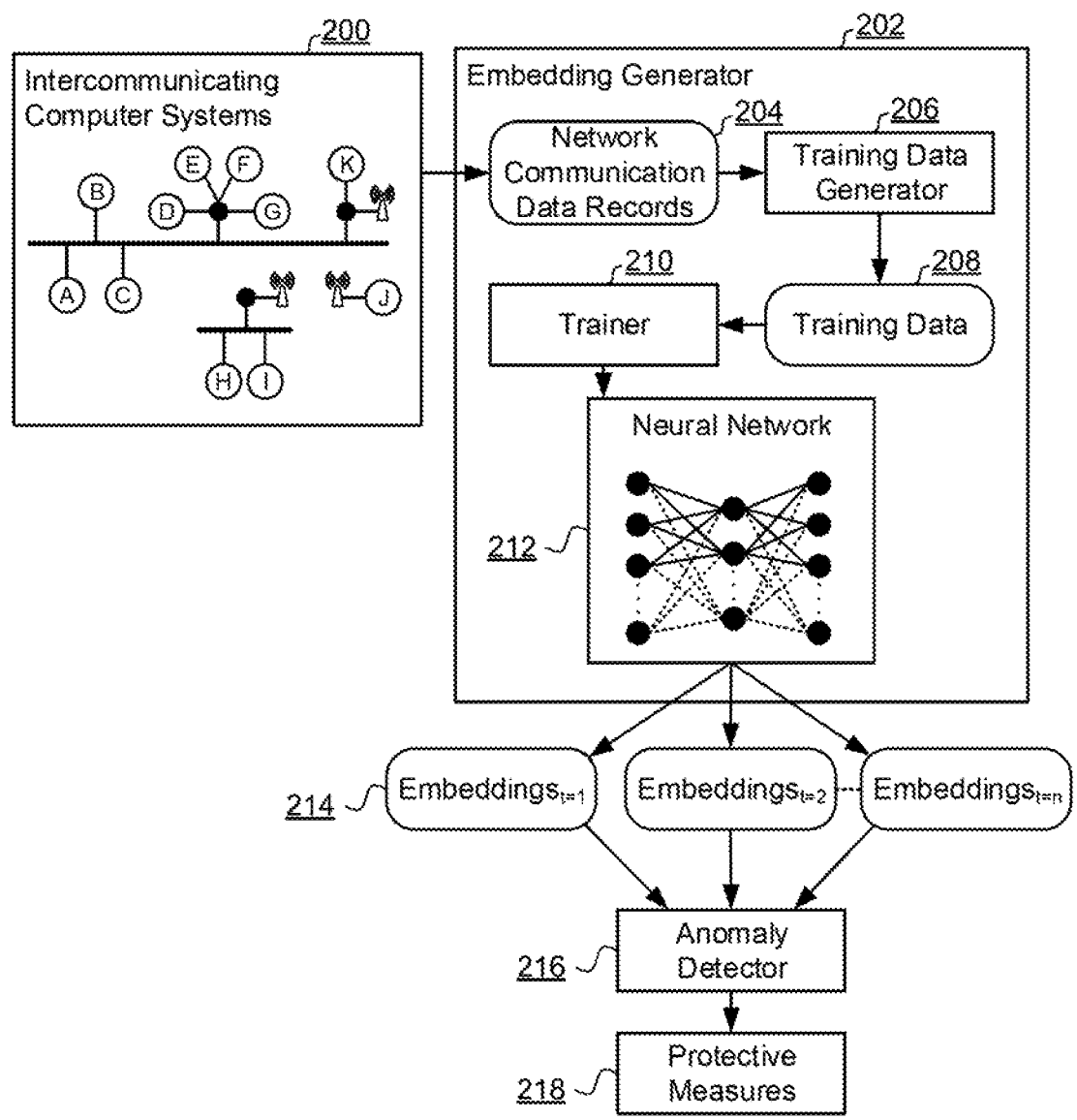
FIG. 2 is a component diagram of an arrangement for detecting anomalous behavior within a computer network in accordance with embodiments of the present disclosure.

FIG. 2 is a component diagram of an arrangement for detecting anomalous behavior within a computer network in accordance with embodiments of the present disclosure. An exemplary network of intercommunicating computer systems 200 is illustrated comprising one or more virtual or physical network elements such as wired, wireless, cellular, local area, wide area and other networks. Communicatively connected via the network are physical and/or virtual computer systems indicated as A through K. The computer systems intercommunicate via the network using one or more networking protocols such that each network communication includes attributes as features of the communication. Such attributes for a communication can include, inter alia: an address of a source of the communication; an address of a destination of the communication; an identification of a communications port at a source of the communication; an identification of a communications port at a destination of the communication; an identifier of a protocol of the communication; a size of the communication; a number of packets of the communication; a set of network protocol flags used in the communication; a timestamp of the communication; a duration of the communication; and other attributes as will be apparent to those skilled in the art.

An embedding generator 202 is provided as a software, hardware, firmware or combination component suitable for receiving network communication data records 204 in respect of network communications occurring via the computer network. Each network communication data record 204 is a record of an occurrence of communication occurring between computer systems via the network. For example, a tool suitable for generating network communication data records 204 is NetFlow. NetFlow enables devices such as routers, switches, monitors and computer systems to analyze traffic passing through, for example, a network interface. Each record of NetFlow data represents a network flow, i.e., a unidirectional sequence of network packets between endpoints. Each flow can be described by, inter alia: source and destination addresses; source and destination port numbers; a protocol; a number of bytes; a number of packets; a timestamp; a duration; and a type of service. One challenges in processing NetFlow data is its sheer size, its sparsity, and the fact that is hard for the human eye to interpret it. Hence there is a need for automated ways of processing this type of data.

The embedding generator 202 includes a training data generator 206 as a software, hardware, firmware or combination component arranged to access the network communication data records and generate training data for a neural network 212. In some embodiments, the training data is generated according to the approach of Ring et al. (see, in particular, section IV of Ring et al. and the example illustrated in FIG. 3 of Ring et al.) such that each network communication data record 204 is used to generate a plurality of training data items. Notably, the particular selection of context in Ring et al. as a subset of the fields of each network communication data record 204 (a flow in Ring et al.) can be adapted and predefined for a particular implementation and/or application of embodiments of the present disclosure according to need. For example, more or fewer attributes of network communication data records 204 can be included in the generation of training data items. Thus, the training data generator 206 generates the training data 208 that is subsequently used by a neural network trainer 210 to train the neural network 212. The trainer 210 is a software, hardware, firmware or combination component arranged to read training data items 208 and apply them through a neural network training process to adjust the interconnection weights in the neural network 212. For example, each training data item 208 can be constituted as a pair of attribute values for a single network communication data record 204, the attribute values existing in the corpus of all attribute values for network communication data records 204 with a first attribute value being used to trigger an input node corresponding to that attribute value in the neural network, and the second attribute value being used as a desired output of the neural network. A backpropagation training algorithm can be applied to train the neural network using such pairs of values (see, for example, "Learning internal representations by backpropagating errors", D. E. Rumelhart, G. E. Hinton, R. J. Williams, September 1985, Institute for Cognitive Science Report 8506, University of California, San Diego). In some embodiments, the neural network 212 is trained using stochastic gradient descent and backpropagation.

Figure 3:
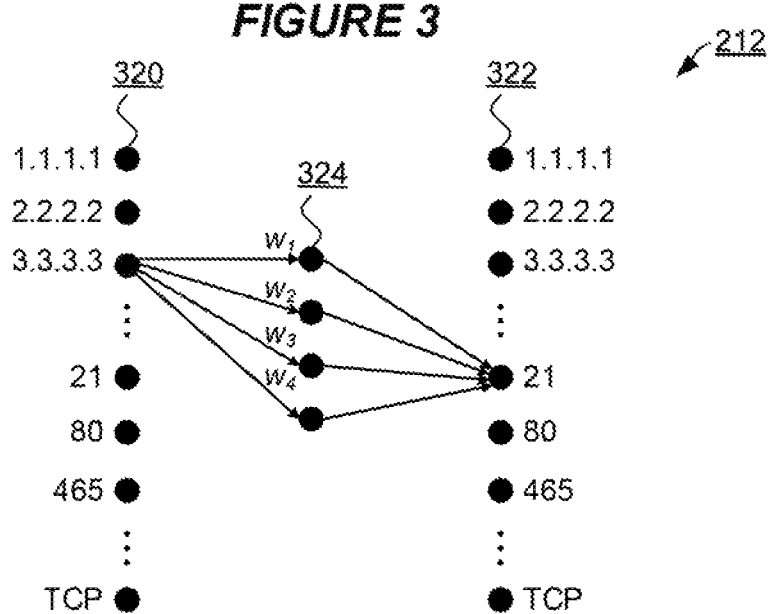
FIG. 3 depicts a partial exemplary neural network suitable for operation in embodiments of the present disclosure.

Once trained, the neural network 212 serves as a basis for defining embeddings 214 for each attribute value in the corpus based on the data used to train the neural network 212. According to Ring et al., for a particular attribute value, a vector constituted by the values of the weights of all connections in the neural network 212 from an input node corresponding to the attribute value to each hidden node can constitute a vectoral embedding for the attribute value. Reference is made now to FIG. 3, which depicts a partial exemplary neural network 212 suitable for operation in embodiments of the present disclosure. The neural network 212 of FIG. 3 is a partial representation because it shows only the connections between a single input node and hidden nodes, and between the hidden nodes and an output node. The neural network 212 of FIG. 3 depicts a set of input nodes 320 each corresponding to attribute values for a network communication. By way of example, the input nodes 320 are depicted including attribute values for network addresses, ports and network protocols. The exemplary input nodes 320 depicted include network addresses as internet protocol (IP) addresses 1.1.1.1, 2.2.2.2 and 3.3.3.3. Further, the exemplary input nodes 320 depicted include network ports 21, 80 and 465. Further, the exemplary input nodes 320 depicted include the network protocol "TCP" (transmission control protocol). Equivalent output nodes 322 are also provided. FIG. 3 also depicts the weights $w_1$, $w_2$, $w_3$ and $w_4$ of connections between one input node for IP address 3.3.3.3 and a set of hidden units 324. In FIG. 3, the neural network 212 is trained with the sample {3.3.3.3, 21}, so indicated by the weighted connections between the node for 3.3.3.3 and the hidden units, and between the hidden units and output node 21. A vector with the components $w_1$, $w_2$, $w_3$ and $w_4$ thus constitutes a vector representation of the IP address 3.3.3.3 and is an embedding for IP address 3.3.3.3.

According to embodiments of the present disclosure, multiple such embeddings 214 are generated for multiple different time periods such that each embedding 214 is derived from the neural network 212 trained using training data 208 generated from network communication data records 204 occurring within that time period. In this way, multiple generations of vector representations for each attribute value in the corpus are generated, each generation corresponding to data records received during a different time period. A time period can be defined such as by way of start and end times, a start time and duration, a start time and end-condition, start and end conditions, or other mechanisms for defining a time period as will be apparent to those skilled in the art. Accordingly, for each time period t, network communication data records 204 arising within the time period are collected and used to generate training data 208 associated with that time period. The neural network 212 is trained using training data 208 for the time period and embeddings 214 are defined as vector representations of weights in the trained neural network 212 for at least a subset of the attribute values represented by the input nodes 320. In some embodiments, only the weights from an input node 320 to hidden nodes 324 are used in the vector representation. Vector representations for a time t period are then stored as embeddings associated with the period t thus: embeddings$_{t=1}$, embeddings$_{t=2}$ ... embeddings$_{t=n}$.

FIG. 2 also includes an anomaly detector 216 as a software, hardware, firmware or combination component operable to receive a plurality of embeddings 214 for comparison. In particular, the anomaly detector 216 performs a similarity analysis on a pair of vector representations for an attribute value, each vector representation corresponding to an embedding 214 generated for a different time period. In this way, differences between embeddings between time periods for a communications attribute value can be discerned and, where such differences meet or exceed a threshold degree of difference, a determination of the existence of an anomaly in the operation of a computer system communicating via the network can be made. The anomaly detector 216 can make the vector comparison using a vector similarity function such as a cosine similarity function for comparing vectors as is known in the art. Where a subsequent vector representation for a communications attribute value is sufficiently dissimilar to a vector for the attribute in a different time period (such as a baseline time period corresponding to a period during which computer systems are known to be unencumbered by malware), then an anomaly is identified. Sufficiency of dissimilarity (or similarity) can be predetermined in terms of a degree of difference characterized in dependence on the particular vector similarity function employed—such as an angular difference, an extent of vectoral magnitude difference or a combination or other such characterizations of difference as will be apparent to those skilled in the art. Protective measures 218 can be implemented to protect one or more of the computer systems in the set of intercommunicating computer systems 200 in dependence on the detection of an anomaly by the anomaly detector 216.

Protective measures 218 are deployable software, hardware, firmware or combination facilities or features that can include, for example, the deployment of firewalls, new security measures, additional authentication or authorization checks, execution or updating of antimalware services, preventing communication with one or more computer systems or the whole set of intercommunicating computer systems 200, increasing a level of monitoring, tracing or logging and other protective measures as will be apparent to those skilled in the art. Thus, in use, the embedding generator 202 coupled with the anomaly detector 216 provide for the effective characterization of network communications occurring via a computer network as vector representations of communication attribute values (embeddings 214) for each of a plurality of time periods such that anomalies detected between vector representations can trigger the deployment of protective measures 218.

In one embodiment, a new neural network 212 is trained afresh for each different time period for which the embedding generator 202 operates. Thus, the neural network 212 for a time period is trained using training data 208 derived from network communication data records 204 for communications occurring only within that time period, and each embedding 214 is derived from the neural network 212 accordingly. In accordance with an alternative embodiment, a single neural network 212 is used for all time periods such that the same neural network 212 is trained initially for a first time period t=1 and is further trained (constructively) for each subsequent time period t=2 to t=n for n time periods. In such an approach the embeddings for each time period $embedding_{t=1}$, $embedding_{t=2}$ ... $embedding_{t=n}$ constitute a development of an embedding for a preceding time period. Consequently, a series of embeddings arising from multiply training the same neural network 212 constitute a temporal sequence of embeddings suitable for training a further neural network as a recurrent neural network. Recurrent neural networks can be used to analyse sequential data due to their ability to take multiple inputs one after the other and save state information between inputs. Such recurrent neural networks can be trained in an unsupervised way by making the target output at each step the embeddings for a next step (prediction) or by training a sequence-to-sequence model to reconstruct the entire sequence (autoencoder). Prediction or reconstruction errors derived from a recurrent neural network can then be used by the anomaly detector 216 to indicate how likely a given sequence of embeddings is to be anomalous in comparison to normal sequences used during training. Thus, the anomaly detector 216 can be adapted to comparing multiple generations of vector representations by training a recurrent neural network for each of one or more attribute values in the corpus based on the multiple generations of vector representations. In this way, the trained recurrent neural network is suitable for classifying a subsequent vector representation as anomalous in relation to multiple generations of vector representations.

Figure 4:
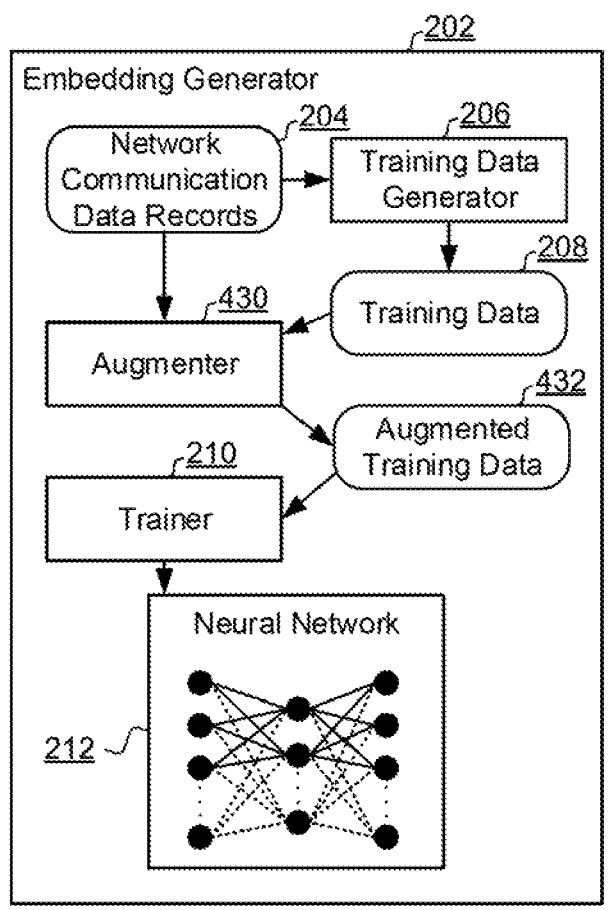
FIG. 4 is a component diagram of the embedding generator of FIG. 2 including an augmenter component according embodiments of the present disclosure.

FIG. 4 is a component diagram of the embedding generator of FIG. 2 including an augmenter component according embodiments of the present disclosure. Many of the elements of FIG. 4 are identical to those described above with respect to FIG. 2 and these will not be repeated here. FIG. 4 is further adapted according to some embodiments of the present disclosure to enhance the training 208 by augmenting it. Thus, the embedding generator 202 of FIG. 4 includes an augmenter 432 as a software, hardware, firmware or combination component arranged to receive or access each item of the training data 208 and the network communication data records 204 on the basis of which the training data 208 was generated, and to generate augmented training data 432 corresponding to the training data 208 with augmentations. The augmented training data 432 is then used by the trainer 210 to train the neural network 212 as previously described.

Specifically, the augmenter 430 performs augmentation of the training data 208 by replicating training data items so that they appear more than once in the augmented training data 432. A determination of whether to replicate a training data item is made based on one or more attributes of a network communication data record 204 corresponding to the training data item. The replication may involve mere duplication of one, more than one or all training data items generated based on a network communication record 204, or repetition of such training data items multiple times in the augmented training data 432. In this way, characteristics of network communication data records 204 deemed significant (based on one or more attribute values thereof) are emphasized in the augmented training data 432 by replication of training data items. In one embodiment, such significance is determined based on a value of one or more attributes in a network communication data record 204 corresponding to a size of a network communication, such that more sizeable communications (e.g. communications with more data, a larger payload, a longer duration or the like) are emphasized in the augmented training data 432 by replication of training data items. For example, the augmenter 430 can augment training data 208 to augmented training data 432 by replicating training data items in response to a determination that a value of a size attribute of a network communication data record 204 corresponding a training data item exceeds a predetermined threshold.

In one embodiment, training data items are replicated based on duration of communication indicated within a network communication data record 204 as a communication flow duration. Let T_flow be a flow duration for a network communication, and T_max be a predetermined maximum duration (such as a maximum duration deemed plausible or a selected maximum duration). For each network communication data record 204, a number of times m a training data item 208 is to be replicated (i.e. a number of times a single training data item should exist in the augmented training data 432) is calculated as:

$$m = \lceil T\_flow / T\_max \rceil$$

where $\lceil \cdot \rceil$ denotes the ceiling operator. Hence, after augmentation, m training data items will be produced in the augmented training data 432 for each training data item generated in the training data 208 for the single network communication data record 204. In some embodiments, the duplicate data items are identical to an original training data item except that training data item corresponding to a duration (in this example) is adjusted to reflect the replication such that the duration for the first m−1 training data items is T_max, and the duration for a final training data item is T_flow−(m−1)T_max.

Figure 5:
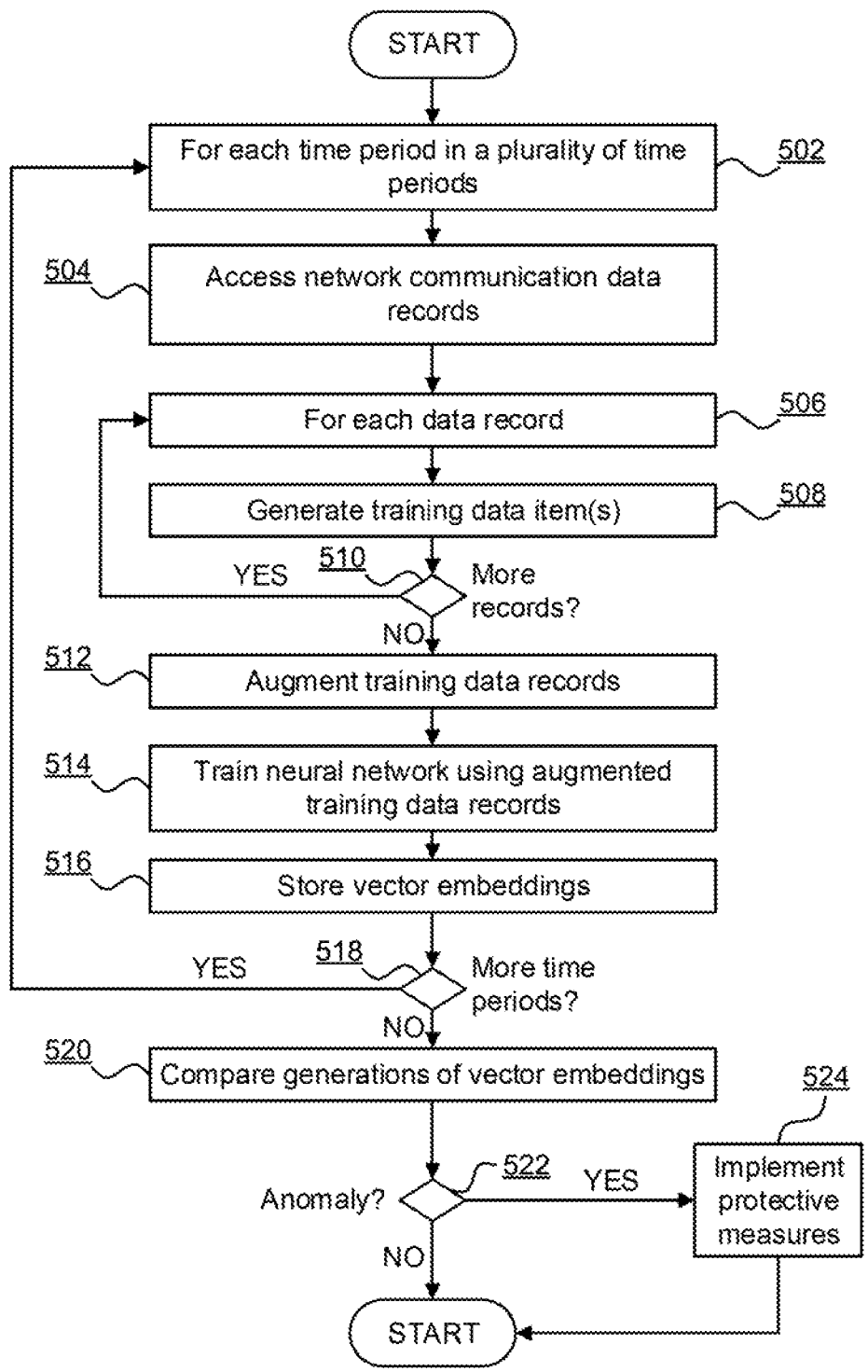
FIG. 5 is a flowchart of an exemplary method of detecting anomalous behavior within a computer network in accordance with embodiments of the present disclosure.

FIG. 5 is a flowchart of an exemplary method of detecting anomalous behavior within a computer network in accordance with embodiments of the present disclosure. Initially, at 502, the method commences an iteration through a series of predetermined or determinable time periods t. At 504 a set of network communication data records 204 for the time period are accessed. At 506 an iteration is commenced for each data record in the set of accessed network communication data records 204. At 508 the method generates one or more training data items for the current network communication data record 204. At 510 the iteration continues for all network communication data records 204. According to some embodiments, the method subsequently augments, at 512, the set of all training data items generated at 508 for the current time period t by the augmentor 430 as previously described. At 514 the neural network 212 is trained using the training data 208 (or, where augmented, the augmented training data 432). At 516 the vector embeddings 214 for each value in the corpus of attribute values are stored for the current time period t. At 518 the method iterates for all time periods. Subsequently, at 520, the anomaly detector 216 compares generations of vector representation embeddings 214, e.g. using a vector similarity function such as cosine similarity. At 522 detected anomalies lead to 524 at which protective measures are deployed.

Some embodiments of the present disclosure will now be described with reference to FIGS. 6, 7 and 8 in which a decision tree process is used to determine anomalous behavior of computer systems in the interconnected computer systems 200. The mechanism according to some embodiments creates a word embedding (vector) representation for each computer system (host) in a network based on certain desired features. A standard word2vec algorithm described in Mikolov et al. is typically used for text analysis, and works, in its skip gram implementation, by selecting a window of words around a current target word, and by classifying as similar those target words that share a similar context, i.e., that are surrounded by the same words in the window.

In embodiments of the present disclosure, sentences are replaced by data about network communications—such as NetFlow data—which can detail unidirectional flows of network packets sharing source and destination addresses (such as IP addresses), source and destination ports and protocols. For example, if a source IP address is considered as an input feature and a destination IP address is considered as an output feature, an aim of embodiments of the present disclosure can be to determine similarities among various source IP addresses on the basis of their corresponding destination IP addresses.

Several features can be considered in parallel so that the impact of those features on a host computer system's behavior can be understood separately, allowing to better explain the reason why an anomaly arises, e.g., because a host is suddenly using a certain protocol more frequently compared to its normal behavior, or because it is addressing a previously unused port number. For example, the following is a non-exhaustive list of features that can be considered when dealing with NetFlow data:

| Input Feature | Output Feature |
| --- | --- |
| Source IP address | Destination IP address |
| Source IP address | Destination port |
| Source IP address | Protocol |
| Source IP address | Type of service |

As far as features such as "number of bytes sent" and "flow duration" are concerned, these may be considered as output features themselves, or they may be instead taken into account by appropriately augmenting the original data, e.g., by considering the techniques for augmentation described above.

Initially, the proposed mechanism characterizes normal behavior of each host by evaluating its vector representations (embeddings) during a baseline time period, i.e. when no known attacks or malicious activity take place. Such a period can be described as a period absent malicious intervention—such as when the network is operating in a protected mode of operation, separated from possible malicious entities or confirmed to be absent malicious intervention. Subsequently, the mechanism computes vector representations (embeddings) for each host during a runtime period of operation, also referred to herein as a period of "system operation", so that deviations from the baseline embeddings would represent potentially malicious activity.

Figure 6:
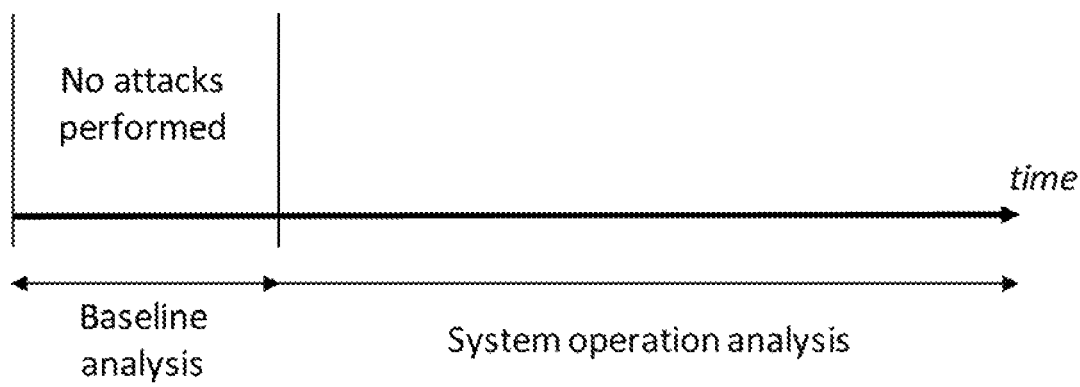
FIG. 6 is a schematic illustration of time periods of communication via a computer network in accordance with embodiments of the present disclosure.
Figure 7:
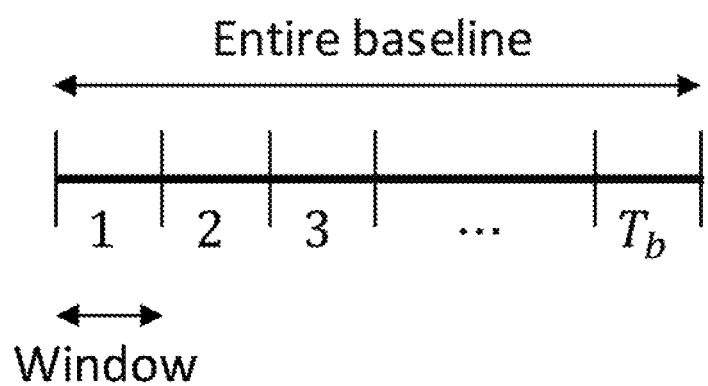
FIG. 7 is a schematic illustration of a baseline time period of communication via a computer network in accordance with embodiments of the present disclosure.

FIG. 6 is a schematic illustration of time periods of communication via a computer network in accordance with embodiments of the present disclosure and shows the distinction between baseline and system operation (runtime) analysis. The baseline is typically considerably shorter than the system operation runtime.

Analysis of the baseline period of operation will now be considered. Let the baseline duration be divided into $T_b$ shorter time windows as illustrated in FIG. 7. Two parallel training operations are performed:

For each host, the word embeddings (vector representations) for the entire duration of the baseline are computed. These represent each host's typical behavior considering the entire baseline.

For each host, the word embeddings (vector representations) during the shorter time intervals within the baseline are computed, in order to characterize each host's finer behavior.

In some embodiments, the baseline is trained regularly to ensure its relevance over time and in order to include new hosts that may have entered the network.

The evaluation of a difference between embeddings (vector representations) will now be considered. Let $e_t^i \in \mathbb{R}^l$ be a word embeddings vector for host i computed at the end of time interval t, where l is the number of nodes in the hidden layer of the embeddings neural network (see). Let $e_b^i \in \mathbb{R}^l$ denote the embeddings vector for host i computed at the end of the baseline time period, where the subscript b highlights that these embeddings are computed at the end of the baseline time period. For the i-th host, let $\delta_t^i$ represent the $l^2$-norm of the difference of the host's embeddings computed for the time interval t and the host's embeddings computed over the entire baseline time period, i.e.:

$$\delta_t^i \triangleq \sqrt{\sum_{k=1}^{l}(e_{t,k}^i - e_{b,k}^i)^2}, \qquad (1)$$

where $e_{t,k}^i$ and $e_{b,k}^i$ are the k-th components of the embeddings vector $e_t^i$ and $e_b^i$, respectively.

Let $$\delta_M^i \triangleq \max_t\{|\delta_t^i|\}$$

be the highest value for the embeddings difference for host i over the baseline time period. Then, provided that a long enough duration for the baseline time period is considered, if during the test time (runtime time period) the i-th host changes its behavior so that its embeddings difference is greater than $\delta_M^i$, then this host has anomalous behavior that is potentially suspicious. This is because the host experiences a variability that is beyond that one normally registered during the baseline time period. In practice, after evaluation against various datasets, it is found that considering a small interval of additional variation v, typically computed as a small percentage of $\delta_M^i$, is beneficial in removing many false positives. Hence, a condition for each host i during test time is the following:

$$\text{Host } i : \begin{cases} \text{potentially suspicious if } \delta_t^i > \delta_M^i(1+v), \\ \text{nonsuspicious otherwise,} \end{cases} \forall t, \forall i. \quad (2)$$

Alternatively, it is also possible to consider other measures to model a host behavior, e.g., computing its average embeddings difference and its variance across the entire baseline time period.

A level of activity in relation to a host's classification will now be considered. A sum embeddings' difference for host i is defined over the entire duration of the baseline time period as follows:

$$\Delta_b^i \triangleq \sum_{t=1}^{T_b} \delta_t^i, \quad (3)$$

where $\Delta_b^i$ represents an extent to which the behavior of host i changes in each time window of the baseline time period with respect to its overall baseline behavior. This measure is provided as a way to measure a host's behavior variability compared to its average behavior. Then, a proposed mechanism classifies all the hosts according to their level of activity in the baseline time period $\Delta_b^i$ into low $l_b$, medium $m_b$, or high $h_b$ levels of activity, i.e., each host is assigned a specific level of activity $a_b^i \in \{l_b, m_b, h_b\}$. The definition of low, medium, and high levels of activity may be performed in various ways depending on the application, e.g., by considering the 50% of the hosts with lowest activity $\Delta_b^i$ as low, the higher 25% as high, and the intermediate 25% as medium.

During runtime period of operation (also referred to herein as test time), at every time interval each host is ranked again according to its embeddings difference, and its corresponding classification for each time interval is computed as $a_t^i \in \{l_b, m_b, h_b\}$. Let $l_b \le m_b \le h_b$ and let $A_t^i \triangleq a_t^i - a_b^i$ be the difference in the i-th host's activity between its baseline activity level and its runtime activity level at time t. Then, the mechanism classifies as potentially suspicious those hosts whose level of activity increases at test time as compared to the baseline, i.e.:

$$\text{Host } i : \begin{cases} \text{nonsuspicious if } A_t^i \le 0, \\ \text{potentially suspicious otherwise,} \end{cases} \forall t, \forall i. \quad (4)$$

Clustering of the hosts will now be considered. Similar to the embodiments described above, the present embodiment clusters all of the hosts' embeddings so that hosts having a similar behavior are clustered together. Such clustering also enables highlighting each hosts' movements across clusters over time which can characterize anomalous behavior. Several clustering algorithms can be adopted, e.g., DBSCAN as described in "A Density-based Algorithm for Discovering Clusters a Density-based Algorithm for Discovering Clusters in Large Spatial Databases with Noise" (M. Ester, H.-P. Kriegel and J. a. X. X. Sander, in Proc. Int. Conf. on Knowledge Discovery and Data Mining, Portland, Oreg., USA, 1996) and/or HDBSCAN as described in "Density-Based Clustering Based on Hierarchical Density Estimates" (R. J. G. B. Campello, D. Moulavi and J. Sander, in Proc. Advances in Knowledge Discovery and Data Mining, Gold Coast, Australia, 2013). Let the clustering information for host i at time t be denoted by $c_t^i$, i.e., $c_t^i$ is a number denoting the cluster the i-th belongs to.

First, clustering takes place in an original high-dimensional embeddings space moreover, we also consider the possibility to project down the embeddings onto a two-dimensional space to provide better intuition for humans about the hosts behavior. This entails using algorithms such as principal component analysis (PCA) or t-distributed stochastic neighbor embedding (t-SNE) for dimensionality reduction followed by a clustering algorithm. However, projecting data down onto two-dimensions, for example by using the t-SNE algorithm, can cause distortion in the data depending on the algorithm's chosen parameters and so this is not preferred.

In analyzing the result of a clustering algorithm, one aspect of meaningful information is whether the host belongs to a relatively large cluster (showing typical or shared characteristics) or whether it belongs to a relatively small cluster (less typical characteristics) or to a noisy area (if the considered clustering algorithm also outputs noise). It is noteworthy that this distinction is meaningful because hosts belonging to relatively large clusters share their behavior more commonly compared to hosts belonging to relatively small clusters; and the anomalous behavior is typically found within hosts that have a more unique behavior compared to the others, hence, which belong to small clusters or to noisy areas.

Let a set of large clusters for the baseline time period and the test data (during runtime time period) be denoted by $C_b^L$ and $C_t^L$. The definition of a large cluster typically depends on the data, but it is found that values within 20% and 30% of the total number of elements in a vocabulary can work well in practice. Given these definitions, suspicious hosts can be defined as those hosts that move from a large cluster in the baseline to a small cluster or to the noise during test data, as these would mean a significant change of behavior, i.e., following condition for each host are evaluated:

$$\text{Host } i : \begin{cases} \text{potentially suspicious if } c_b^i \in C_b^L \text{ and } c_t^i \notin C_t^L, \\ \text{nonsuspicious otherwise,} \end{cases} \forall t, \forall i. \quad (5)$$

After checking if a host has transitioned from a large cluster to a small cluster/noise, the mechanism checks if a host resides in a large cluster during the runtime time period; if this condition is true, then we consider this host as nonsuspicious:

$$\text{Host } i : \begin{cases} \text{nonsuspicious if } c_t^i \in C_t^L, \\ \text{potentially suspicious otherwise,} \end{cases} \forall t, \forall i. \quad (6)$$

In summary, after training the baseline the following information is known about each of the hosts i:
  Its embeddings (vector representations) computed over the entire baseline $e_b^i$, and for each time window $e_t^i$;
  Its clustering information $c_b^i$, i.e., whether the host is in a large cluster;

The sum of the differences of its embeddings across the entire baseline, $\Delta_b^i$; and The highest value of the embeddings difference over the baseline $\delta_M^i$.

The mechanism according to embodiments of the present disclosure depends on the baseline in order to monitor a host's normal behavior, which is then compared to the host's behavior during runtime period of operation. However, it may happen that new hosts appear during the runtime period which were unseen during the baseline. Since the baseline behavior for these hosts is not known, it is not possible to classify it based on the entity of its embeddings difference, given by equation (2), the evolution of its behavior, given by equation (4), or the change in cluster, given by equation (5). However, these hosts are still classifiable on the basis of equation (6).

A new baseline may also be computed including both the new hosts as well as all the previous hosts. However, creating a new baseline requires training again the embeddings model for a potentially considerable duration which requires computational resources. Moreover, it is noted that before creating the baseline for new hosts, care must be taken to ensure that these hosts are fully legitimate. In fact, the baseline can only be trained if the hosts are thought to be behaving in a fully legitimate way (i.e. absent malicious intervention).

When a host is not making any connections at any time interval t, its embeddings difference for this time interval will be set to 0 to avoid unnecessary false positives, i.e., $\delta_t^i=0$, and this host will be ignored in the clustering algorithm as well. Hence, this host is considered as a benign one.

Figure 8:
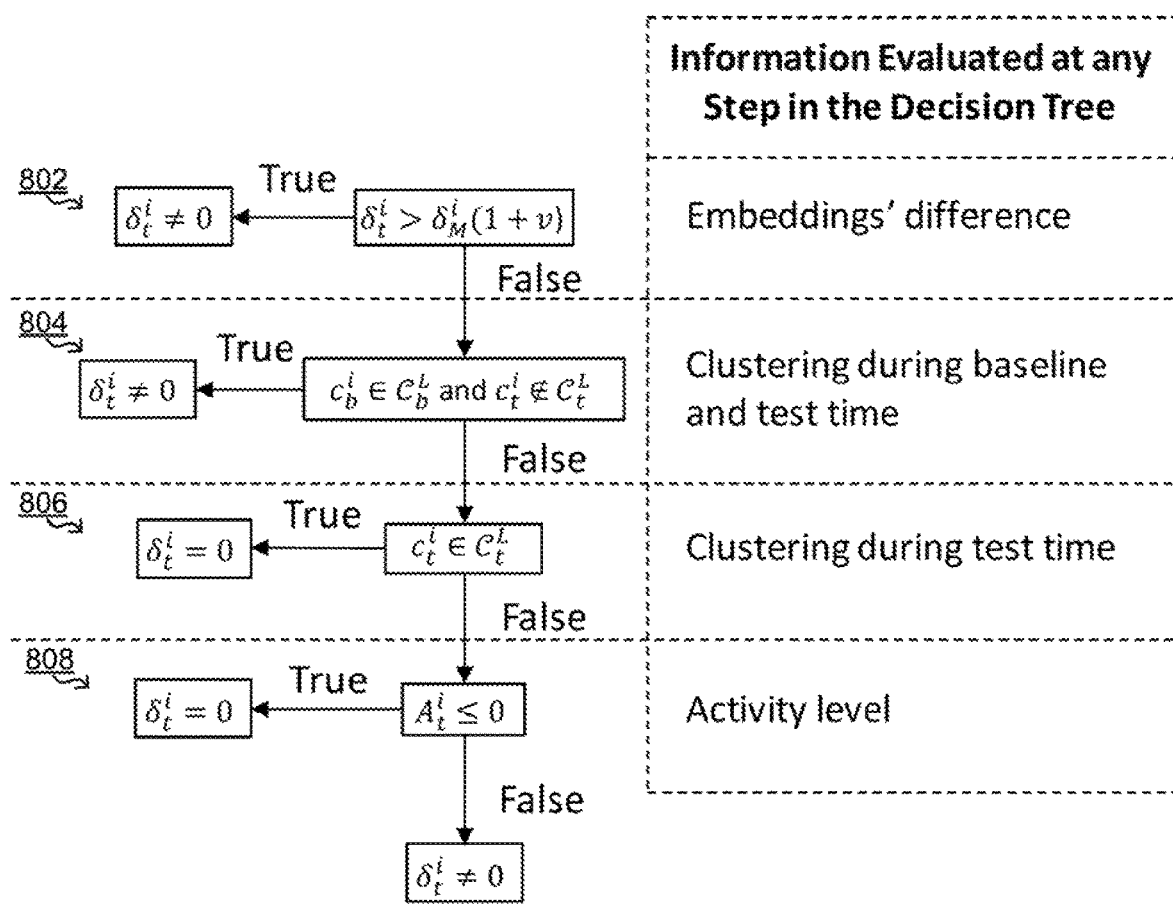
FIG. 8 is a flowchart of a decision tree in accordance with embodiments of the present disclosure.

FIG. 8 is a flowchart of a decision tree in accordance with embodiments of the present disclosure. The proposed method as illustrated in FIG. 8 considers all of the previously-defined steps to spot anomalies by using a purposely-defined decision tree. An aim of the decision tree is to reduce a number of false positives while increasing an accuracy of the algorithm. At step 802 an embeddings difference is tested. At step 804 clustering during the baseline time period and the runtime (test) time period are tested. At step 806 clustering during only the runtime (test) time period is tested. At step 808 activity level is tested. The leaves of the decision tree can be of two kinds:

1. $\delta_t^i=0$, which force host i embeddings difference to zero, i.e., host i is neglected and considered as benign; this kind of leaf is used to reduce a number of false positives.
2. $\delta_t^i \neq 0$, which label host i as potentially suspicious, hence keeping its embeddings difference for further investigation.

Output of the decision tree is a set of hosts (e.g. by IP address) considered to be suspicious during a current runtime time window. This information can be further elaborated by either a cybersecurity analyst directly, or it can be also used as input to an additional machine learning algorithm. Further, the protective measures 218 previously described are applied on detection of such anomalous behavior.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the disclosure is not limited thereto and that there are many possible variations and modifications which fall within the scope of the disclosure.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of detecting anomalous behavior in a set of computer systems communicating via a computer network, the method comprising:

generating a baseline set of vector representations for each of a plurality of network communications occurring in the computer network during a baseline time period when the plurality of network communications are absent malicious intervention, each vector representation being derived from a neural network trained using training data defined from the plurality of network communications;

iteratively generating a runtime set of vector representations for each of a plurality of network communications occurring in the computer network during subsequent runtime time periods;

applying a clustering algorithm to each of the baseline and runtime sets of vector representations to define each of a baseline and a runtime set of clusters of vector representations;

determining a level of activity of each computer system during the baseline time periods, the level of activity being determined according to a sum of differences of vector representations for the computer system between sub-periods of the baseline time period;

for each of the computer systems, determining anomalous behavior responsive to any of:
an evaluation of a measure of difference between the baseline and runtime vector representations for the computer system exceeding a threshold level of difference,
an evaluation of a change of cluster membership of a vector representation for the computer system between the baseline and runtime sets of clusters, an evaluation of a membership of a vector representation for the computer system in a runtime set of clusters, and an evaluation of a difference in a level of activity of the computer system between the baseline and the runtime time periods; and responsive to the determination of anomalous behavior, implementing one or more protective measures for the computer network.

2. The method of claim 1, wherein generating each of the baseline and runtime vector representations comprises:

accessing data records each corresponding to an occurrence of communication occurring via the computer network and including a plurality of attributes of the communication;

generating, for each of at least a subset of the data records, a training data item for a neural network, the training data item being derived from at least a portion of the attributes of the record and the neural network having input units and output units corresponding to items in a corpus of attribute values for communications occurring via the network; and training the neural network using the training data items so as to define a vector representation for each attribute value in the corpus based on weights in the neural network for an input unit corresponding to the attribute value.

3. The method of claim 1, wherein the protective measures include one or more of:

deploying or configuring a firewall at one or more computer systems connected via the computer network;

deploying or configuring anti-malware facility at one or more computer systems connected via the computer network;

deploying or configuring an antivirus facility at one or more computer systems connected via the computer network;

adjusting a sensitivity or a level of monitoring of a security facility in one or more computer systems connected via the computer network; or selectively disconnecting one or more computer systems from the computer network.

4. The method of claim 2, wherein the attributes of a communication include one or more of:

an address of a source of the communication; an address of a destination of the communication;

an identification of a communications port at a source of the communication;

an identification of a communications port at a destination of the communication;

an identifier of a protocol of the communication;

a size of the communication;

a number of packets of the communication;

a set of network protocol flags used in the communication;

a timestamp of the communication; or a duration of the communication.

5. The method of claim 1, wherein the neural network has a single layer of hidden units logically arranged between the input units and the output units.

6. The method of claim 1, wherein a difference between vector representations is evaluated by applying a vector similarity function.

7. A computer system comprising:

a processor and memory storing computer program code for detecting anomalous behavior in a set of computer systems communicating via a computer network by:

generating a baseline set of vector representations for each of a plurality of network communications occurring in the computer network during a baseline time period when the plurality of network communications are absent malicious intervention, each vector representation being derived from a neural network trained using training data defined from the plurality of network communications;

iteratively generating a runtime set of vector representations for each of a plurality of network communications occurring in the computer network during subsequent runtime time periods;

applying a clustering algorithm to each of the baseline and runtime sets of vector representations to define each of a baseline and a runtime set of clusters of vector representations;

determining a level of activity of each computer system during the baseline time periods, the level of activity being determined according to a sum of differences of vector representations for the computer system between sub-periods of the baseline time period;

for each of the computer systems, determining anomalous behavior responsive to any of:

an evaluation of a measure of difference between the baseline and runtime vector representations for the computer system exceeding a threshold level of difference, an evaluation of a change of cluster membership of a vector representation for the computer system between the baseline and runtime sets of clusters, an evaluation of a membership of a vector representation for the computer system in a runtime set of clusters, and an evaluation of a difference in a level of activity of the computer system between the baseline and the runtime time periods; and responsive to the determination of anomalous behavior, implementing one or more protective measures for the computer network.

8. A non-transitory computer-readable storage medium storing a computer program element comprising computer program code to, when loaded into a computer system and executed thereon, cause the computer system to perform the method of claim 1.

* * * * *